(No Model.)

C. G. BROYHILL.
HORSE BLANKET

No. 415,089.  Patented Nov. 12, 1889.

Witnesses
Albert Speiden
E. H. Bond

Inventor
Calvin G. Broyhill
By his Attorney
Chas. H. Fowler

UNITED STATES PATENT OFFICE.

CALVIN G. BROYHILL, OF NORMAL, ILLINOIS.

HORSE-BLANKET.

SPECIFICATION forming part of Letters Patent No. 415,089, dated November 12, 1889.

Application filed January 5, 1889. Serial No. 295,556. (No model.)

*To all whom it may concern:*

Be it known that I, CALVIN G. BROYHILL, a citizen of the United States, residing at Normal, in the county of McLean and State of Illinois, have invented certain new and useful Improvements in Fastenings for Horse-Blankets; and I do hereby declare that the following is a full, clear, and exact description of the same, reference being had to the annexed drawings, making a part of this specification, and to the letters of reference marked thereon.

Figure 1:
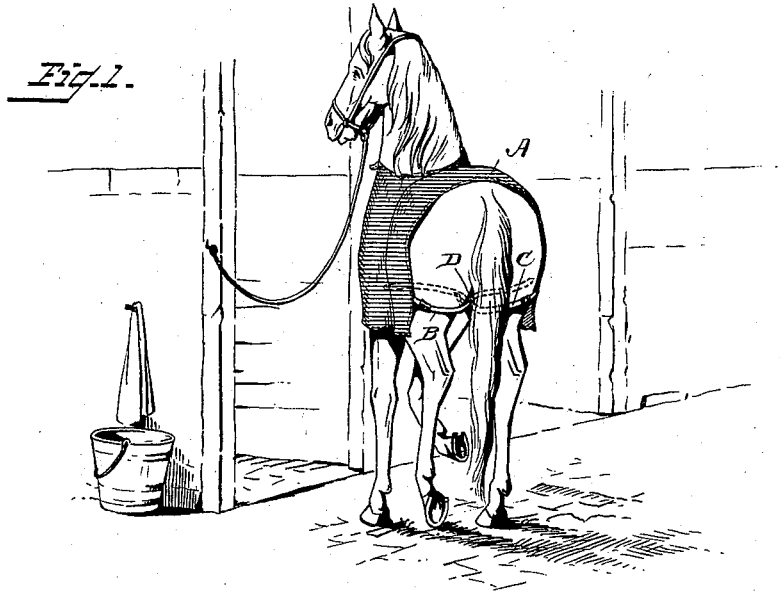
Figure 2:
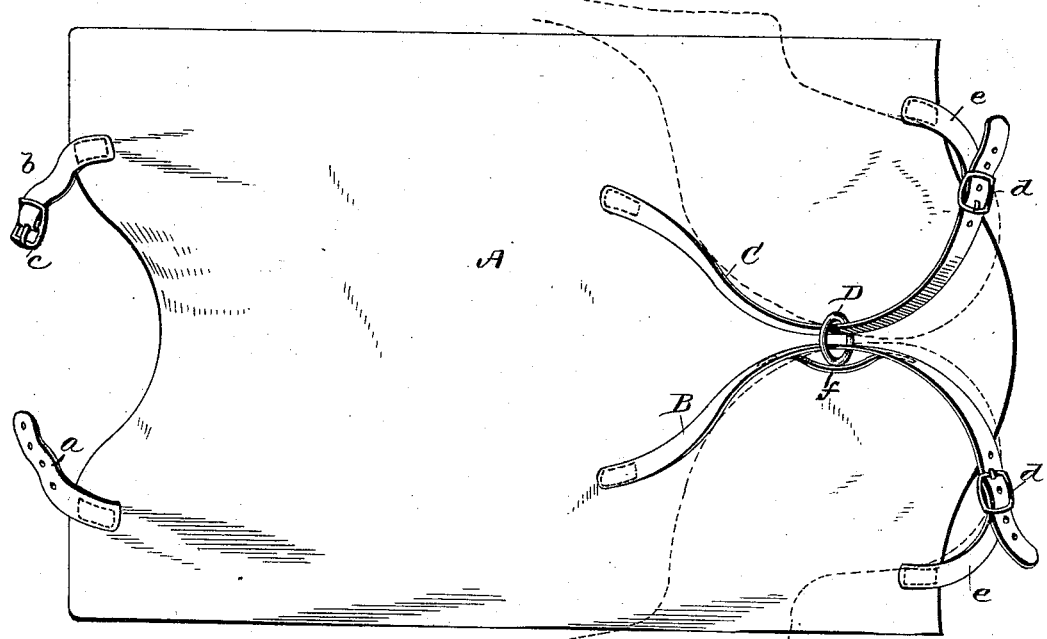

Figure 1 of the drawings is a perspective view of my invention, showing the blanket upon the horse and held thereon by my improved fastening; and Fig. 2, an under side plan view showing the position of the fastening-straps with relation to the hind quarters of the animal, the hind quarters being shown in dotted lines.

The object of the present invention is to provide a simple and effective means for securely holding blankets upon horses, whereby the danger of the blankets dropping off from any cause is entirely avoided, while the animal is allowed free movement without strain upon the blanket, which object I attain by the construction substantially as shown in the drawings, and hereinafter described and claimed.

In the accompanying drawings, A represents the blanket of the usual form and construction, and provided at its front end with usual fastenings consisting of the straps *a b* and buckle *c*.

The improved means of securing the blanket upon the horse at the hind quarters of the animal constitutes the feature of my invention, and consists in the straps B C, connected at their forward ends to the blanket by any well-known means. These straps are of sufficient length to pass around the hind quarters of the animal, as shown in Fig. 2, after which the free ends of these straps connect with buckles *d* upon the ends of short straps *e*, attached to the rear ends of the blanket. A ring D encircles the straps B C, said ring being held in connection with the former by means of a short strap *f*, which has its ends secured thereto by sewing or any other preferred or well-known means. The ring D forms a connection between the two straps that will prevent the blanket from being pulled or rubbed off on either side of the horse. The ring also serves the purpose to form a guide for the straps through which they pass and allows both the straps free play to slip back and forth, and the consequent free movement of the horse without strain upon the blanket.

It will be seen that a very simple as well as effective fastening is provided that will successfully attain the end sought—viz., to securely hold the blanket in place, allow free movement of the horse without danger of injury to the blanket by any strain thereon, while the fastening is inexpensive compared with those in ordinary use.

Having now fully described my invention, what I claim as new, and desire to secure by Letters Patent, is—

The combination, with a horse-blanket having suitable fastenings at its front end, of rear straps connected at their forward ends to the blanket and adapted to pass around the hind quarters of the animal, and their free ends engaging with buckles upon the rear end of the blanket, a ring encircling said straps, and means, substantially as described, for limiting the movement of the ring, substantially as and for the purpose set forth.

CALVIN G. BROYHILL.

Witnesses:
R. L. FLEMING,
W. C. BRUBAKER.